US010239286B2

(12) United States Patent
Duong (10) Patent No.: US 10,239,286 B2
(45) Date of Patent: *Mar. 26, 2019

(54) PACKAGING PRODUCT WITH THERMAL AND MECHANICAL INSULATION FEATURES

(71) Applicant: AKX, SA, Alfortville (FR)

(72) Inventor: Alice K. Duong, San Diego, CA (US)

(73) Assignee: AKX, SA, Alfortville (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,080

(22) Filed: Aug. 29, 2017

(65) Prior Publication Data

US 2018/0079173 A1    Mar. 22, 2018

Related U.S. Application Data

(63) Continuation of application No. 14/810,274, filed on Jul. 27, 2015, now Pat. No. 9,757,925.

(60) Provisional application No. 62/029,317, filed on Jul. 25, 2014.

(51) Int. Cl.
| | |
|---|---|
| *B32B 3/00* | (2006.01) |
| *B32B 7/14* | (2006.01) |
| *B32B 27/32* | (2006.01) |
| *B32B 27/36* | (2006.01) |
| *B32B 15/08* | (2006.01) |
| *B32B 27/08* | (2006.01) |
| *B32B 27/30* | (2006.01) |
| *B32B 27/34* | (2006.01) |
| *B32B 3/12* | (2006.01) |

(52) U.S. Cl.
CPC .................. *B32B 7/14* (2013.01); *B32B 3/12* (2013.01); *B32B 15/08* (2013.01); *B32B 27/08* (2013.01); *B32B 27/306* (2013.01); *B32B 27/32* (2013.01); *B32B 27/34* (2013.01); *B32B 27/36* (2013.01); *B32B 2255/10* (2013.01); *B32B 2255/205* (2013.01); *B32B 2270/00* (2013.01); *B32B 2307/304* (2013.01); *B32B 2307/7244* (2013.01); *B32B 2553/00* (2013.01)

(58) Field of Classification Search
CPC .............................. B32B 7/14; B32B 2439/70
See application file for complete search history.

(56) References Cited

U.S. PATENT DOCUMENTS

| | | | |
|---|---|---|---|
| 7,056,575 | B2 | 6/2006 | Aanestad |
| 7,621,404 | B2 | 11/2009 | Murray |
| 2003/0075549 | A1 | 4/2003 | O'Brien et al. |
| 2009/0269572 | A1 | 10/2009 | Orologio et al. |

(Continued)

*Primary Examiner* — Elizabeth E Mulvaney
(74) *Attorney, Agent, or Firm* — Kilpatrick Townsend & Stockton LLP (57) ABSTRACT

A packaging product taking the form of a thermally insulating packaging material includes a first multi-layer film bonded to a second layer of multi-layer film. Each multi-layer film can include one or more polymer layers and one or more metallized layers. The multi-layer films are bonded to each other with a pattern that leaves a number of inflatable cells dispersed across a surface of the sheet. At least one end of the sheet can be left unbonded. The uninflated packaging product can be stored and distributed in its uninflated state prior to it being used as a packaging material. Once ready for use, the cells can be inflated through the unbonded ends and the unbonded ends of the sheets can then be sealed to form a robust sheet of thermally insulating packaging material.

20 Claims, 9 Drawing Sheets

(56) References Cited

U.S. PATENT DOCUMENTS

| | | |
|---|---|---|
| 2013/0183485 A1 | 7/2013 | Quenedey et al. |
| 2013/0189484 A1 | 7/2013 | Quenedey et al. |
| 2014/0120304 A1 | 5/2014 | Ghali et al. |
| 2015/0053086 A1 | 2/2015 | Hopp et al. |
| 2015/0159366 A1 | 6/2015 | Bolisay et al. |
| 2016/0023437 A1 | 1/2016 | Duong |

PACKAGING PRODUCT WITH THERMAL AND MECHANICAL INSULATION FEATURES

CROSS-REFERENCES TO RELATED APPLICATIONS

This application is a continuation of U.S. application Ser. No. 14/810,274 filed on Jul. 27, 2015; which claims priority under 35 U.S.C. § 119(e) to U.S. Provisional Application No. 62/029,317 filed on Jul. 25, 2014. The contents each are hereby incorporated by reference and for all purposes herein.

FIELD

The described embodiments relate generally to the production of inflatable packaging materials. More particularly, the present embodiments relate to packaging materials that can be distributed to users of the packaging materials in an uninflated state.

BACKGROUND OF THE INVENTION

Packaging materials taking the form of laminated or heat sealed film layers defining numerous discrete pockets of air have been commonly used in the industry to reduce the stress of impacts upon items being transported. While these types of packaging materials can reduce the transmission of stresses or impacts received by a shipping container to an item carried within the shipping container, the spacing between the discrete pockets of air can prevent the packaging materials from providing a robust thermal barrier suitable for maintaining a temperature of the item being carried within the shipping container. For at least this reason, improvements in shipping materials that also provide excellent thermal insulation are highly desirable.

BRIEF SUMMARY OF THE INVENTION

This paper describes various embodiments that relate to thermally insulating shipping materials.

The present invention relates generally to packaging technology. More particularly, embodiments of the present invention relate to methods and systems for packaging materials that provide improved thermal insulation in comparison with conventional solutions. Applications of the present invention include use in pouches, pallet covers, alternatives to conventional bubble wrap materials, thermal bags, and the like. The invention has wider applicability than this example and is suitable for application to other packaging applications.

According to an embodiment of the present invention, an insulating packaging material is provided. The insulated packaging material, which can be referred to as a laminated or heat sealed structure and can provide a flexible insulating material to be converted in packaging materials, includes a first multi-layer film including a first polymer layer and a first metallized layer. The insulated packaging material also includes a second multi-layer film including a second polymer layer and a second metallized layer. The first multi-layer film is joined to the second multi-layer film over a bonded region. The bonded region is interspersed with unbonded regions that when filled with gas form an array of adjacent hexagonal shapes.

Numerous benefits are achieved by way of the present invention over conventional techniques. For example, embodiments of the present invention provide packaging materials that are useful for shipping or transporting of perishable or temperature sensitive products. The described embodiments include embedding metallized layers within inflatable packaging materials using one or more polymer layers, thereby increasing thermal insulation performance.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF THE INVENTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Embodiments of the present invention provide a flexible packaging material that includes a lamination of two or more layers of film with a heat seal or adhesive pattern. These packaging materials are useful for a variety of thermal insulation applications. As described herein, two or more multilayer films are heat sealed using a continuous or semi-continuous pattern. The multilayer films include one or more layers that are a metallized film along the lines of a metallized polyester film or in some embodiments a thin sheet of aluminum foil. The multilayer films also include one or more polymer layers that can enclose an oxygen barrier layer that allows the finished product to be inflated for an extended period of time and provides for increased amounts of thermal insulation. The lamination process (either hot or cold lamination) joins the multi-layer films together. In some embodiments, the polymer layers can be disposed on the outside of the finished product, while in other embodiments the metallized film or aluminum foil layers can be positioned along an exterior of the material. Various embodiments of the present invention are described that enable the formation of close cell-to-cell spacing, which provide robust thermal insulation properties for the joined multilayer films after inflation. While substantially planar sheets of packaging material are depicted throughout this paper, it should be understood that the described packaging materials can be shaped and manipulated in many ways. In some embodiments, the packaging materials can take the form of pouches, bags and panels of varying shape and size.

These and other embodiments are discussed below with reference to FIGS. 1A-4E; however, those skilled in the art will readily appreciate that the detailed description given herein with respect to these figures is for explanatory purposes only and should not be construed as limiting.

Figure 1A:
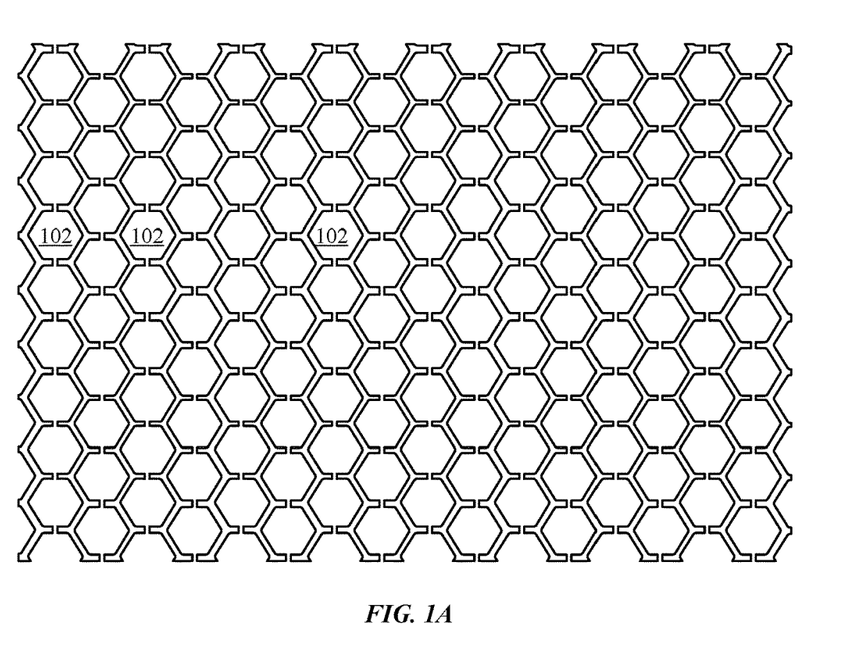
FIG. 1A shows a plan view of packaging material having a pattern of hexagonally shaped cells, according to an embodiment of the present invention.

FIG. 1A shows a plan view of a section of a flexible packaging material structure having a hexagonal pattern of cells 102. The pattern of cells 102 includes a continuous pattern along vertical directions from one edge of the pattern to another edge. The pattern includes breaks along the vertical directions to enable gas (e.g. compressed air, argon, $CO_2$ or a mixture of noble gases with krypton/xenon) to pass from one hexagonally shaped cell to another (the cells along a vertical can be referred to as a chain of cells) during inflation. The hexagonal cell shape in cooperation with the hexagonal cell arrangement allow for particularly close spacing of the cells, thereby maximizing an area of the flexible packaging material defining and enclosing a robust layer of air. It should be noted that while the hexagonal cells are shown as being precisely hexagonal it should be understood that generally speaking a footprint or portion of the packaging material that is not bonded together can be hexagonal and a resulting shape of the cell when inflated will be substantially hexagonal in shape. It should also be noted that the while a vertical pattern of connected hexagonally shaped cells is depicted, the breaks defining the chains of cells could alternatively be oriented in diagonal or horizontal directions. In some embodiments, two or more adjacent chains of cells can be linked to simplify inflation operations.

Figure 1B:
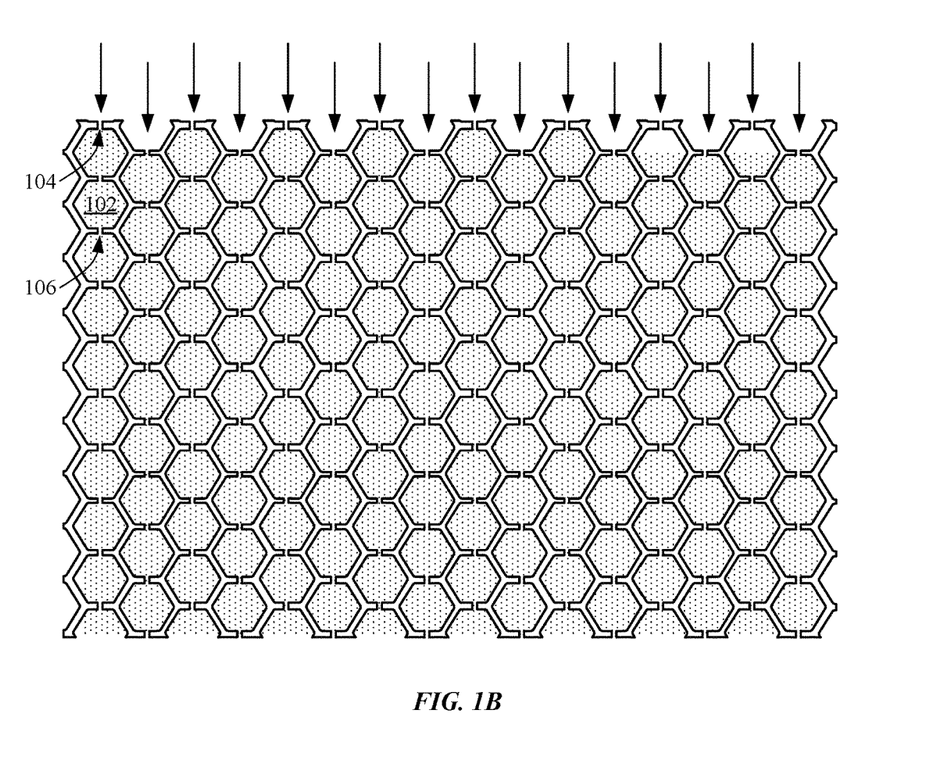
FIG. 1B shows an annotated plan view of the flexible packaging material illustrated in FIG. 1A.

FIG. 1B is an annotated plan view of the flexible packaging material structure illustrated in FIG. 1A. As illustrated in FIG. 1B, each vertical chain of cells is independent from the other vertical chains to maintain performance of adjacent chains if one cell in the chain of cells is punctured. The arrows in FIG. 1B indicate inflation points 104 through which a gas can be introduced in order to inflate the structure with gas disposed between opposing portions of the films.

The flexible packaging material structure can be inflated in many ways, including for example, by a single valve or alternatively by a continuous inflation process. Peripheral edges of the packaging material can be sealed during inflation while moving along the peripheral edge of the packaging material. The described methods can be utilized in conjunction with the inflation points. In some embodiments, heat seals can be arranged along a perimeter or lateral portion of the packaging material to define the surface of the pouch, bag or cover. Along each vertical chain of hexagonal cells, breaks are positioned at opposing sides of the hexagons and take the form of orifices 106 that provide for gas flow along a respective vertical chain. The set of opposing orifices constitutes a break in the sealing pattern, preventing the two films from being joined at the position of the orifices. Thus, along the vertical, the hexagonal shapes are effectively unsealed and in fluid communication each other and the ambient atmosphere.

Embodiments of the present invention are fabricated by laminating the two coextruded or laminated multi-layer films, with the films joined at the bonding region. The interior regions of the hexagonal structures are in fluid communication with atmosphere through the orifices running along each chain of hexagonal cells. Not only do the orifices provide for flow of gas along the chains, but the inflation points 104 located at the end of each chain of hexagonal cells provides for inflation or deflation of each the chain. Accordingly, in contrast with conventional bubble wrap, which is manufactured and distributed in an inflated state, embodiments of the present invention can be manufactured (e.g., laminated) and then shipped in an uninflated condition to an end user.

Figure 1C:
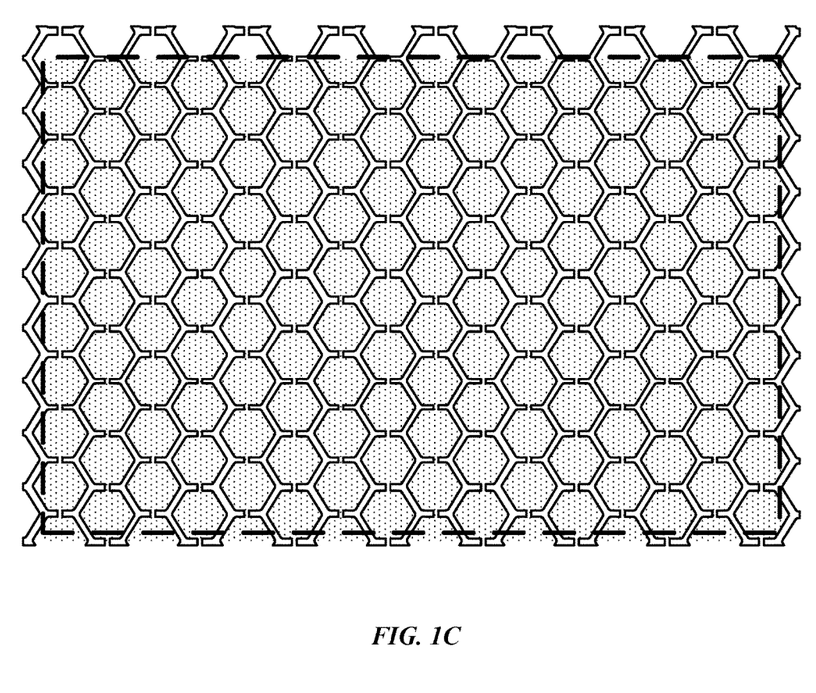
FIG. 1C shows a plan view of the inflated flexible packaging material with the pattern of hexagonally shaped cells sealed to trap gases within the cells.

End users of the shipping materials can then inflate the shipping materials and seal the inflated structure prior to use, for example, by sealing the periphery of the array of hexagonal cells as illustrated in FIG. 1C. Thus, embodiments of the present invention reduce delivery costs since the shipping materials can be delivered from the manufacturer to the end user in the uninflated state, thereafter inflated by the end user, and utilized to ship products from the end user to their customers. In this way, shipments of the shipping materials can enjoy substantial volumetric savings when compared with inflated shipping materials.

Figure 2A:
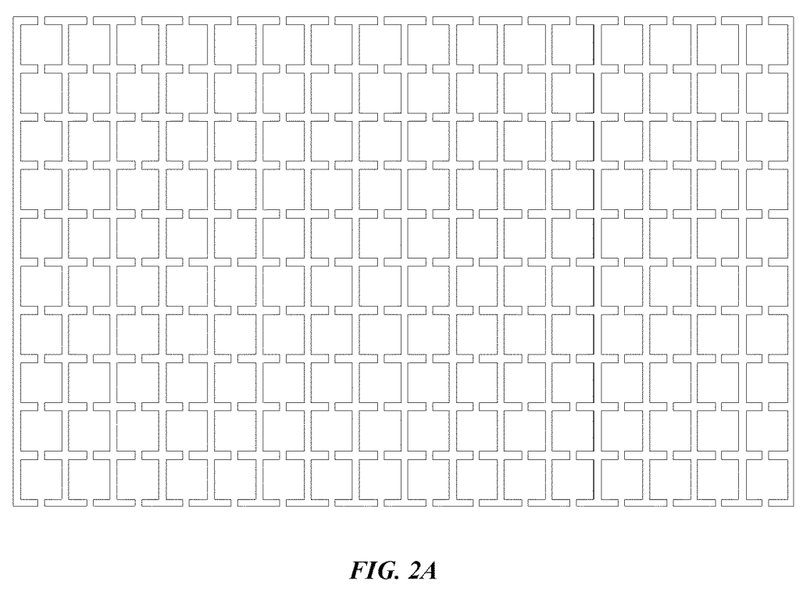
FIG. 2A shows a plan view of a sheet of flexible packaging material having a square or rectangular pattern of cells, according to an embodiment of the present invention.
Figure 2B:
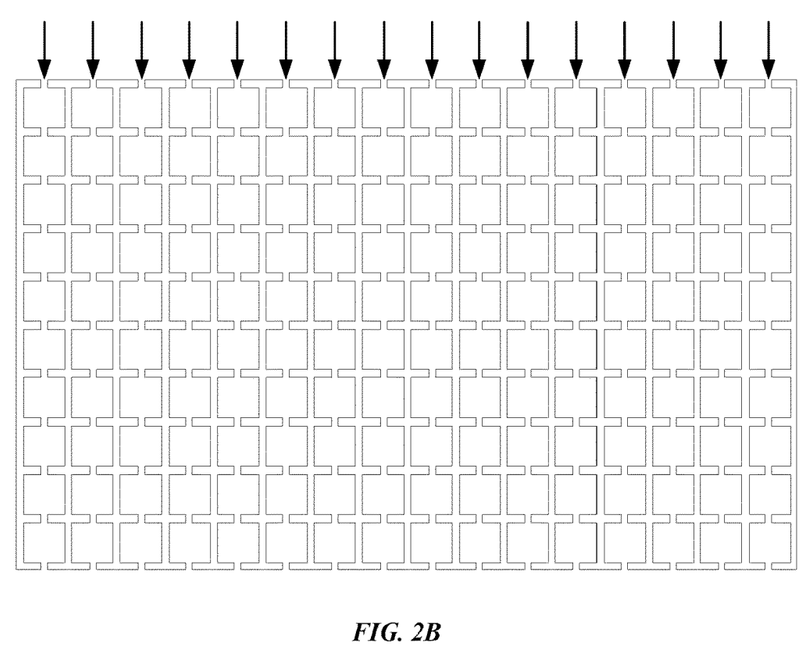
FIG. 2B shows an annotated plan view of the flexible packaging material illustrated in FIG. 2A.
Figure 2C:
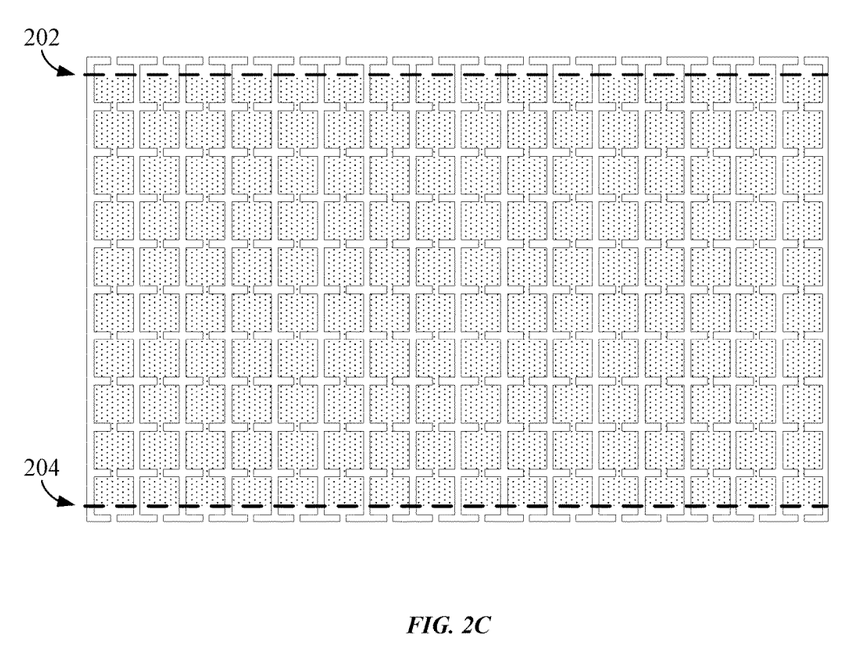
FIG. 2C shows a plan view of the inflated flexible packaging material depicted in FIG. 2A heat sealed at opposing ends to trap gases within the cells.

FIG. 2A is a plan view of a sheet of flexible packaging material formed from two multi-layer films that cooperate to form a pattern of square cells according to an embodiment of the present invention. Although square cells are illustrated, other rectangular cells are included within the scope of the present invention. FIG. 2B is an annotated plan view of the square seal pattern illustrated in FIG. 2A. Each column is independent of the other columns and the columns include orifices in the rectangular shapes, allowing fill gas (e.g., air, nitrogen, or the like) to enter through the orifice at the top or bottom of each column and then flow into the cells along the column, filling the column and separating the thin films not joined at the bonding region. The arrows depicted in FIG. 2B show a location of openings suitable for receiving air to inflate the cells of the sheet of flexible packaging material. After filling, the columns can be sealed at the top and bottom by heat seals 202 and 204, which heat seal the top and bottom cells in each column, i.e., at the periphery, as shown in FIG. 2C. Accordingly, puncturing of a cell in row 3 will not result in damage to rows 2 and 4.

Figure 3:
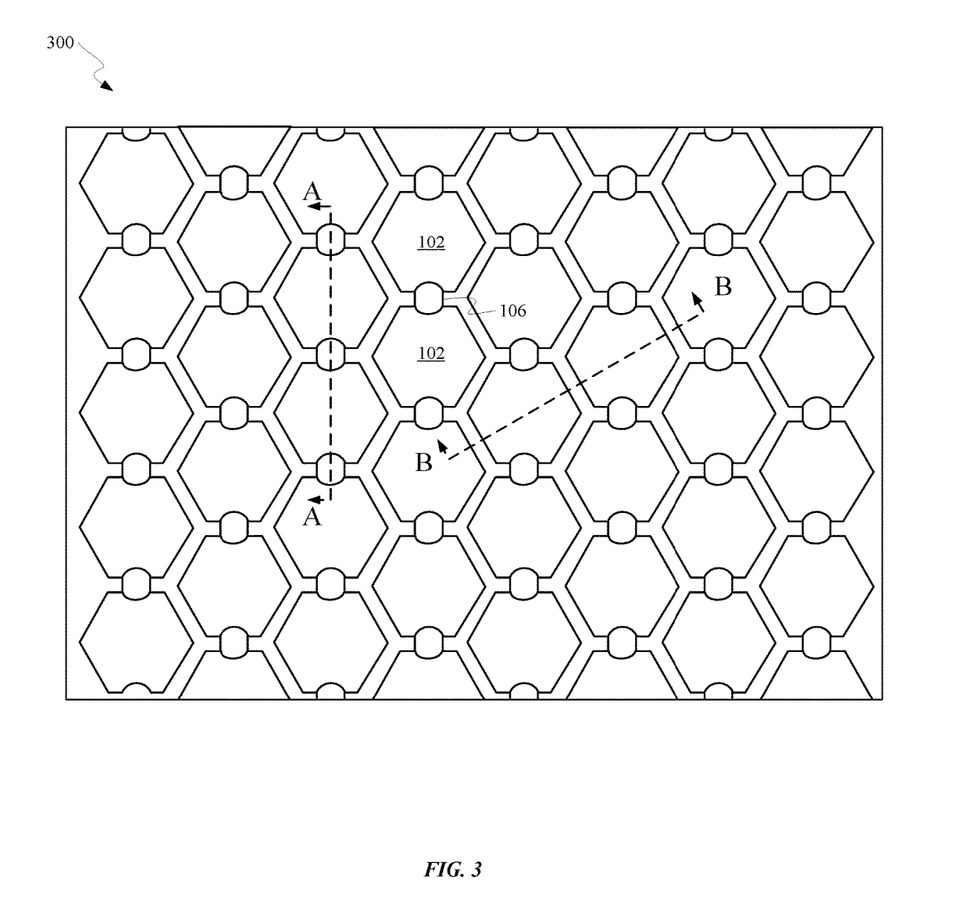
FIG. 3 shows a more detailed plan view of the flexible packaging material illustrated in FIG. 1A.

FIG. 3 is a plan view of inflatable packaging product 300 with hexagonally shaped cells according to an embodiment of the present invention. Embodiments of the present invention reduce or minimize the gap between the inflated cells after inflation. As illustrated in FIG. 3, hexagonal cells 102 are connected by gas passages or orifices 106 passing through opposing sides of the hexagons from top to bottom, which is also the layout illustrated in FIG. 1A. After filling, the majority of the surface area includes spatial separation between the two film layers, providing high thermal performance. In some embodiments, the distance between cells is less than 1/8", for example on the order of 1/16" or 1/32". The use of hexagons as illustrated in FIGS. 1A-1B or rectangular shapes as illustrated in FIG. 2A-2B, reduces the spatial dimension of the bonding region when compared with more conventional circularly shaped cell configuration. Since the packing density is higher than the circular shaped configurations, the thermal performance can be particularly strong in comparison.

Figure 4A:
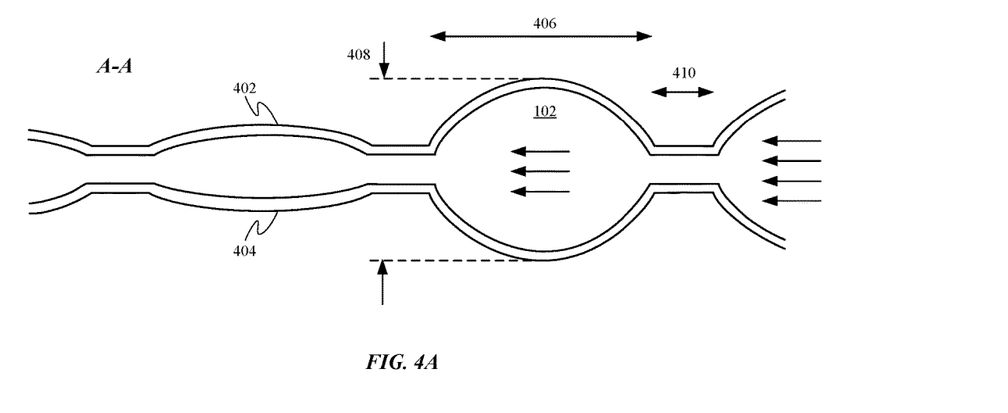
FIG. 4A shows a cross-sectional view of the flexible packaging material illustrated in FIG. 3 during an inflation operation.

FIG. 4A shows a cross-sectional view of inflatable packaging product 300 in accordance with cross-section A-A as it undergoes inflation formed from multi-layer films 402 and 404. In particular, various dimensions of the packaging product are shown in FIG. 4A. In some embodiments, a width 406 of hexagonal cell 102 can be on the order of about 0.3-0.7 inches. An overall thickness 408 of the inflated packaging product can be on the order of between 0.35-0.75 inches and an average distance 410 between adjacent cells 102 can be between 0.03-0.1 inches. An overall uninflated thickness of the inflatable packaging product can be equivalent to a thickness of the layers of film that join it together, particularly when the cells are evacuated of any gases when distributed. FIG. 4A also shows how adjacent cells 102 can be filled sequentially as gases fill the packaging product.

Figure 4B:
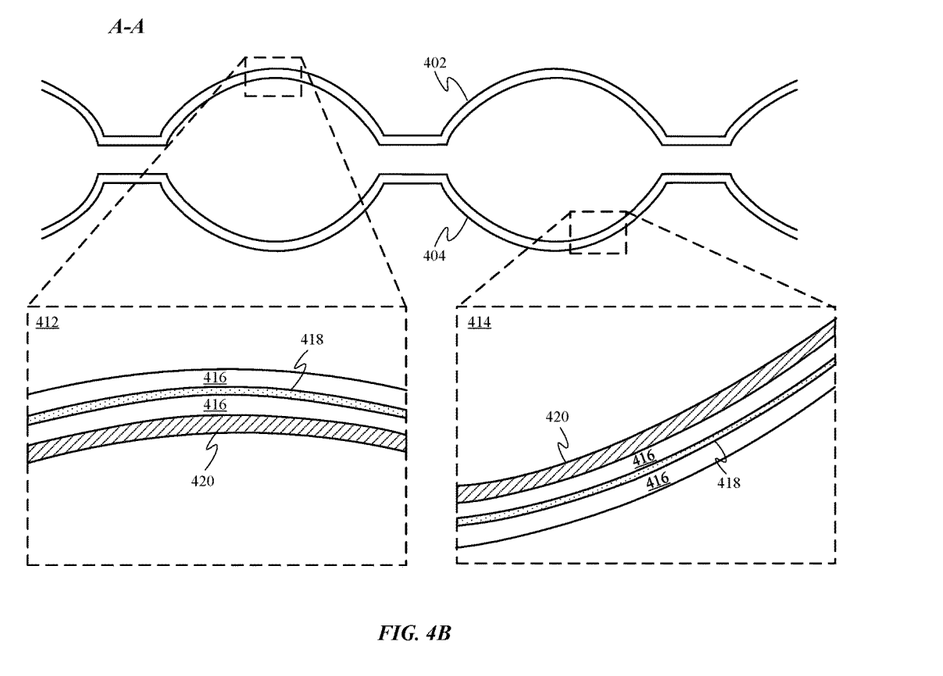
FIGS. 4B-4D show cross-sectional views of the flexible packaging material illustrated in FIG. 3 after inflation in accordance with section line A-A.

FIG. 4B shows another cross-sectional view of inflatable packaging product 300. Detailed views 412 and 414 show a micro-structure of multi-layer film 402 and 404 that are joined to form inflatable packaging product 300. Multi-layer film 402 can be a co-extruded multi-layer film including a polymer layer 416 that defines oxygen barrier 418, taking the form of a thin layer of air trapped within polymer layer 416. When polymer layer 416 is a co-extruded layer formed of multiple polymer layers a binding polymer layer is included as well. Polymer layer 416 can alternatively be formed from a single polymer. Polymer layer 416, provides mechanical support for the metallization layer in addition to defining oxygen barrier 418. In some implementations, polymer layer 416 can include one or more of the following materials or combinations thereof, polypropylene (PP), polyethylene terephthalate (PET), high-density polyethylene (HDPE), low-density polyethylene (LDPE), nylon, ethylene vinyl alcohol (EVOH) or any suitable polymer with heat sealing capability. Although a single polymer layer 416 is illustrated in detailed view 412, polymer layer 416 can include additional sub-layers, providing a multi-layer stack suitable as a substrate for deposition or lamination of metallization layer 420. In some embodiments, multi-layer films 402 and 404 can include multiple polymer layers and can be interspersed with multiple metallization layers 420. It should be noted that the choice of materials used to form polymer layer 416 can change the position of oxygen barrier with respect to other layers of multi-layer films 402 and 404. For example, in embodiments where polymer layer 416 is formed from HDPE, PP, Surlyn® or from other polymers having relatively lower melting points, oxygen barrier 418 can be positioned between polymer layer 416 and metallization layer 420. Additionally, metallization layer 420 is illustrated in detailed view 412 as a single layer, but this is not required by the present invention. Multiple layers of metallization with different material properties can be utilized according to an embodiment of the present invention.

In a particular embodiment, metallization layer 420 can take the form of a single layer of aluminum. One of ordinary skill in the art would recognize many variations, modifications, and alternatives.

Figure 4C:
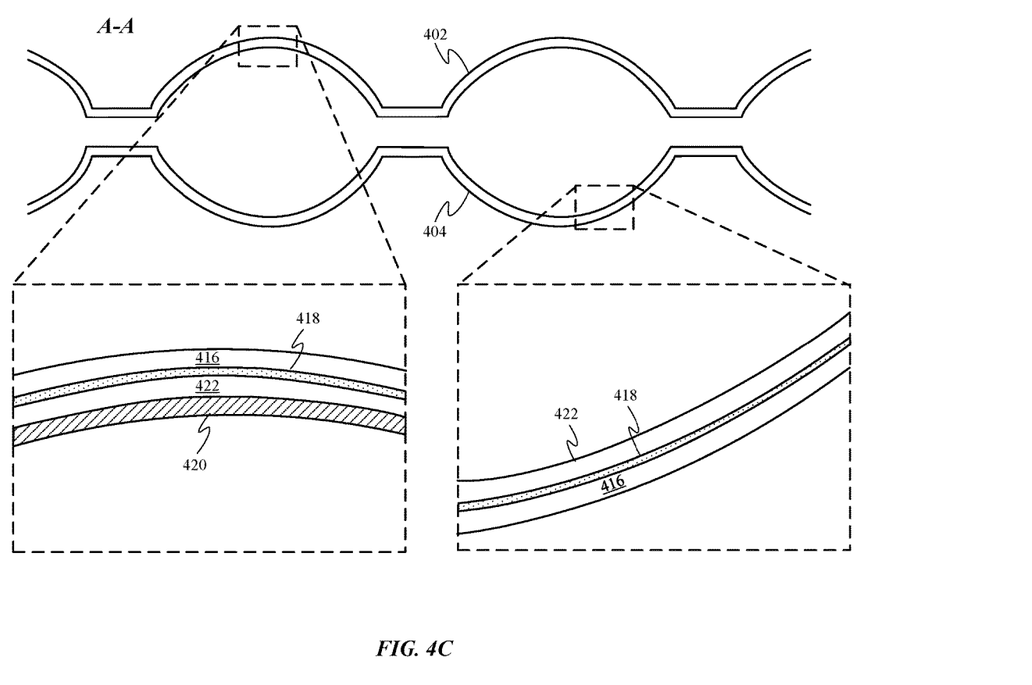
Figure 4D:
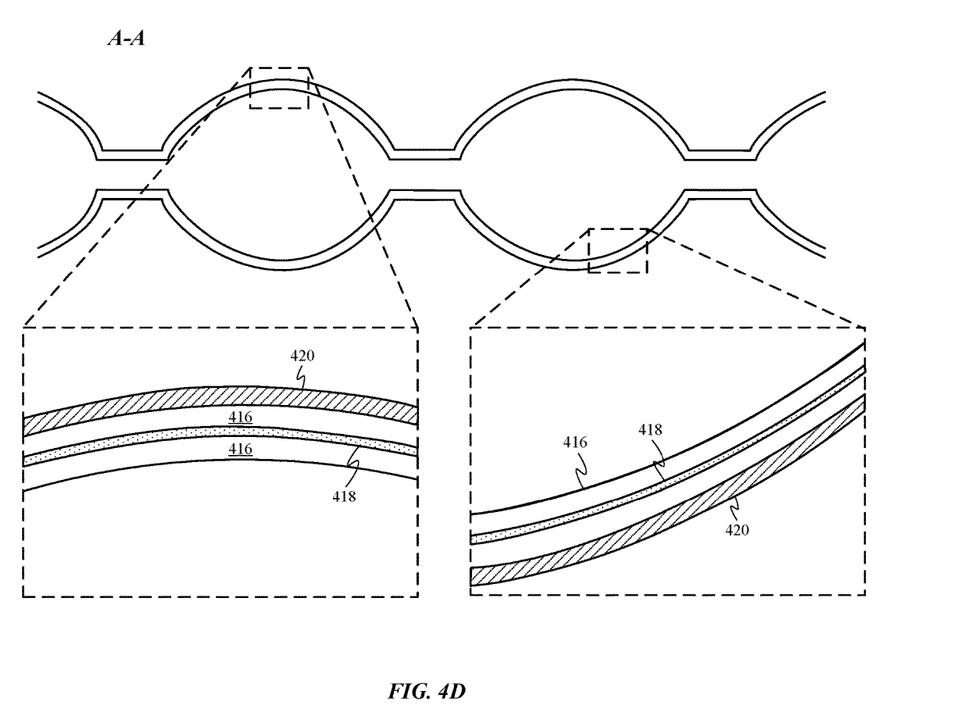

Detailed view 414 shows another portion of inflatable packaging product 300, in particular a portion of multi-layer film 404. The micro-structure of a multi-layer film 404 can be substantially the same as multi-layer film 402 as depicted or it can also be different. Accordingly, multi-layer film 404 is depicted as a metalized layer 420 and a polymer layer 416 defining and entrapping gases within an oxygen barrier layer 418. While the term oxygen in oxygen barrier layer is used by way of example it should be understood that any gas could be entrapped within oxygen barrier layer 418. Furthermore, in some embodiments, various subtle differences could be included in a thickness and or density of polymer layers 416. FIGS. 4C and 4D show specific examples of ways in which the multi-layer films can be configured.

FIG. 4C shows how metallization layer 420 can be attached only to multi-layer film 402, while multi-layer film 404 does not include metallization layer 420. Furthermore, FIG. 4C shows an inner portion of polymer layer indicated as layer 422. In some embodiments, layer 422 can be substantially different than layer 416. For example, in some embodiments a substantially thicker layer 416 can be desirable to reduce a risk of tearing to an exterior layer of inflatable packaging product 300. FIG. 4D shows how metallization layer 420 can be disposed on an exterior surface of inflatable packaging product 300. While not depicted, in some embodiments metallization layer can be positioned on an exterior surface of multi-layer film 402 and an interior surface of multi-layer film 404.

Figure 4E:
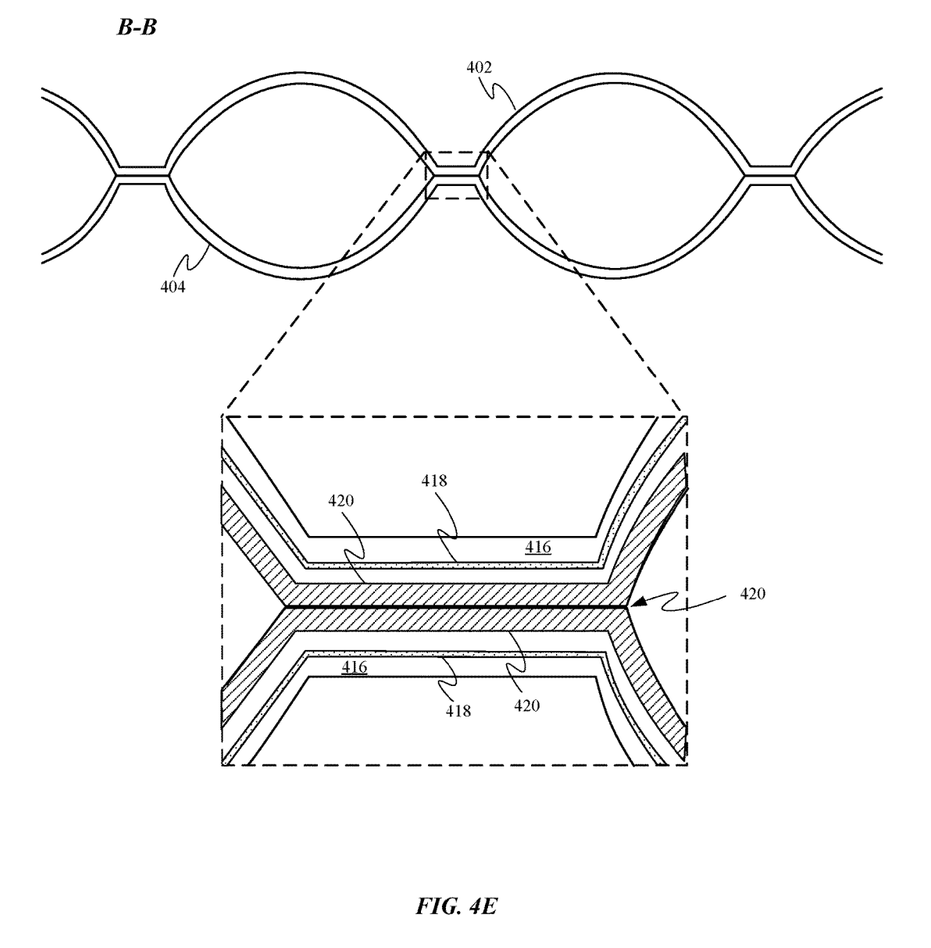
FIG. 4E shows a cross-sectional view of the flexible packaging material illustrated in FIG. 3 after inflation in accordance with section line B-B.

FIG. 4E depicts a cross-sectional view of inflatable packaging product 300 in accordance with section line B-B. As depicted, multi-layer films 402 and 404 are positioned so that metallization layers 420 are joined together at a bonded region taking the form of interface 422 to form the packaging product, which can serve as an insulating structure. In some embodiments, multi-layer films 402 and 404 are joined by lamination, heat sealing or hot melt processes. The converted product, after formation, can remain in the unfilled, uninflated, state during shipment to the end user, which will inflate the packaging product prior to end use. In this manner, the size of the packaging product is smaller during manufacturing and/or shipment to end users than for conventional products that are inflated during manufacture, for example, conventional bubble wrap.

Some embodiments of the present invention contrast with packaging, which can include a bubble wrap layer laminated with a sheet of metalized film or laminated aluminum foil. In these packaging materials, the metal material is located on the exterior of the packaging materials (facing outward), which increases thermal conductivity from the environment to the metal materials and degrades thermal performance. In the embodiments described herein, during manufacturing, the metalized film layers are positioned facing each other and joined together at the bonding region such that the metalized film layers are disposed on the internal portion of the finished structure and utilized in the heat sealing process as the metalized film layers are joined together. It should be noted that adding the metalizing layer on the exterior surface of the packaging can still be effective as it still provides an alternating structure of polymer and metallization that would tend to impede the transfer of heat through the packaging material.

In embodiments in which radiation operates to transfer heat, the low emissivity of polymer layers in comparison with metal layers, results in better thermal performance for shipping materials in which the metallized layers are disposed between polymer layers as illustrated herein. The enclosure of metallized layers within the polymer layers contrasts with conventional structures in which the metallization is applied as an exterior layer, characterized by a high emissivity, high radiation loss, and poor thermal performance. In addition to radiation, heat transfer through conduction and convection are also limited by enclosing the metallized layers within the polymer layers. One of ordinary skill in the art would recognize many variations, modifications, and alternatives.

The various aspects, embodiments, implementations or features of the described embodiments can be used separately or in any combination. Various manufacturing aspects of the described embodiments can be implemented by software, hardware or a combination of hardware and software. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An insulating packaging material, comprising:
a first multi-layer film including a first polymer layer; and
a second multi-layer film including a second polymer layer and a metallized layer, wherein the first multi-layer film is joined to the second multi-layer film over a bonded region, the bonded region being interspersed with unbonded regions that when filled with gas form an array of adjacent cells.

2. The insulating packaging material of claim 1 wherein the first and second polymer layers each define an oxygen barrier layer trapped within each of the polymer layers.

3. The insulating packaging material of claim 1 wherein each adjacent cell includes a set of orifices, the orifices positioned on different sides of the adjacent cell.

4. The insulating packaging material of claim 3 wherein the adjacent cells of the array of adjacent cells have hexagonal geometries and are arranged in a plurality of substantially linear rows, the orifices allowing each row of adjacent cells to be inflated concurrently.

5. The insulating packaging material of claim 1 wherein a ratio of the width of the adjacent cells to an average distance between the adjacent cells is at least 3 to 1.

6. The insulating packaging material of claim 1 wherein the insulating packaging material includes two or more metallized layers.

7. The insulating packaging material of claim 6 wherein the metallized layers are bonded directly together.

8. The insulating packaging material of claim 1 wherein the first and second polymer layers are selected from the group consisting of PP, PET and HDPE.

9. The insulating packaging material of claim 1 wherein the second multi-layer film comprises a layer of aluminum laminated to the second polymer layer and a third polymer layer of the second multi-layer film.

10. The insulating packaging material of claim 1 further comprising a valve configured to receive air to inflate the adjacent cells.

11. A thermally insulating packaging material, comprising:
a plurality of multi-layer films, each one of the multi-layer films including a polymer layer, the plurality of multi-layer films comprising:
a first multi-layer film having a metallized layer, and
a second multi-layer film, a portion of the first multi-layer film being bonded to a portion of the second multi-layer film at a bonded region, the bonded region having a pattern that leaves an unbonded region defining a number of adjacent inflatable cells arranged in a uniform pattern.

12. The thermally insulating packaging material of claim 11 wherein the adjacent inflatable cells comprise a two-dimensional array of inflatable cells, each inflatable cell including a first orifice and a second orifice, the second orifice oriented in a different direction than the first orifice.

13. The thermally insulating packaging material of claim 11 wherein each inflatable cell has a polygonal footprint.

14. The thermally insulating packaging material of claim 13 wherein the adjacent inflatable cells are arranged in a hexagonal pattern.

15. The thermally insulating packaging material of claim 14 wherein each inflatable cell has a hexagonal footprint.

16. The thermally insulating packaging material of claim 15 wherein each polymeric layer defines on oxygen barrier layer.

17. The thermally insulating packaging material of claim 11 wherein each inflatable cell has a rectangular footprint and is arranged in a grid pattern.

18. An inflatable packaging product, comprising:
a first layer, comprising a first polymer layer defining an oxygen barrier layer and a metallized layer joined to the first polymer layer;
a second layer, comprising a second polymer layer defining an oxygen barrier layer,
wherein a portion of the metallized layer is joined directly to the second layer, the joined portion of the metallized layer defining an unbonded region that includes a plurality of connected inflatable cells, each of the plurality of connected inflatable cells being in fluid communication with each other.

19. The inflatable packaging product of claim 18 wherein the plurality of connected inflatable cells include an opening at an end of the inflatable packaging product.

20. The inflatable packaging product of claim 18 wherein a portion of the unbonded region that defines each inflatable cell is hexagonal.

* * * * *